(12) United States Patent
Cooper (10) Patent No.: US 10,059,280 B2
(45) Date of Patent: Aug. 28, 2018

(54) OBSTRUCTION-REMOVAL SYSTEM AND METHOD FOR VEHICLE-CAMERA LENS

(71) Applicant: Joseph Richard Cooper, Calhoun, GA (US)

(72) Inventor: Joseph Richard Cooper, Calhoun, GA (US)

( * ) Notice: Subject to any disclaimer, the term of this patent is extended or adjusted under 35 U.S.C. 154(b) by 312 days.

(21) Appl. No.: 14/637,845

(22) Filed: Mar. 4, 2015

(65) Prior Publication Data
US 2015/0353024 A1 Dec. 10, 2015

Related U.S. Application Data

(60) Provisional application No. 62/008,565, filed on Jun. 6, 2014.

(51) Int. Cl.
| | |
|---|---|
| *H04N 7/18* | (2006.01) |
| *B60R 11/04* | (2006.01) |
| *B60S 1/08* | (2006.01) |
| *B60S 1/54* | (2006.01) |
| *H04N 5/225* | (2006.01) |
| *B60S 1/56* | (2006.01) |

(52) U.S. Cl.
CPC ............ *B60R 11/04* (2013.01); *B60S 1/0848* (2013.01); *B60S 1/54* (2013.01); *B60S 1/56* (2013.01); *H04N 5/2251* (2013.01)

(58) Field of Classification Search
None
See application file for complete search history.

(56) References Cited

U.S. PATENT DOCUMENTS

| | | | |
|---|---|---|---|
| 1,717,904 A | 6/1929 | Abernethy |
| 1,932,798 A | 10/1933 | Millard |

(Continued)

FOREIGN PATENT DOCUMENTS

| | | |
|---|---|---|
| DE | 2411547 | 9/1975 |
| DE | 3212007 | 10/1983 |

(Continued)

OTHER PUBLICATIONS

Ironcore Inc. "MIR KLR Clears Mirrors for Safety." Before Mar. 2015. 1 Page.

(Continued)

*Primary Examiner* — Tracy Y Li
(74) *Attorney, Agent, or Firm* — Gardner Groff Greenwald & Villanueva, PC (57) ABSTRACT

A clearing system removes water and other obstructions from an external-mounted rear-view camera of a vehicle. The system includes an air line connected to a compressed-air source and routed to the camera, and a control valve operable to selectively release compressed air from the air source through the air line. A discharge nozzle of the air line is positioned adjacent a lens cover of the camera to deliver an air blast across the lens cover to remove adhered water. The nozzle is positioned outside of the field of view of the camera so that it does not obstruct the view of the camera. In various embodiments, the compressed-air source and the camera are preexisting and the clearing system is retrofit onto the vehicle, the compressed-air source and/or the camera are provided with the clearing system as a kit, and/or the clearing system is installed as original equipment on the vehicle.

21 Claims, 9 Drawing Sheets

(56) References Cited

U.S. PATENT DOCUMENTS

| | | | |
|---|---|---|---|
| 2,849,760 | A | 9/1958 | Boeke et al. |
| 3,288,378 | A | 11/1966 | Dobson |
| 3,295,004 | A | 12/1966 | Hirsch |
| 3,469,088 | A | 9/1969 | Coleman et al. |
| 3,656,691 | A | 4/1972 | Norstrand |
| 4,044,953 | A | 8/1977 | Vogel |
| 4,088,358 | A | 5/1978 | Hirsch |
| 4,134,612 | A | 1/1979 | Nelson |
| 4,196,930 | A | 4/1980 | Busche |
| 4,505,001 | A | 3/1985 | Fasolino |
| 4,538,851 | A | 9/1985 | Taylor |
| 4,561,732 | A | 12/1985 | Japes |
| 4,611,761 | A | 9/1986 | Pollard |
| 4,898,453 | A | 2/1990 | Hohenecker |
| 4,928,580 | A | 5/1990 | McIntyre et al. |
| 5,096,287 | A | 3/1992 | Kakinami et al. |
| 5,140,719 | A | 8/1992 | Cowan |
| 5,419,005 | A | 5/1995 | Mori |
| 5,546,630 | A | 8/1996 | Long |
| 5,708,859 | A | 1/1998 | Tajima et al. |
| 5,760,828 | A | 6/1998 | Cortes |
| 5,987,216 | A | 11/1999 | Krug |
| 6,077,361 | A | 6/2000 | Glenn |
| 6,249,931 | B1 | 6/2001 | Sato |
| 6,290,361 | B1 | 9/2001 | Berzin |
| 6,527,000 | B1 | 3/2003 | Randmae |
| 6,527,871 | B1 | 3/2003 | Hanson et al. |
| 6,554,210 | B2 | 4/2003 | Holt et al. |
| 6,583,819 | B2 | 6/2003 | Ito et al. |
| 6,917,693 | B1 | 7/2005 | Kiridena et al. |
| 6,944,908 | B2 | 9/2005 | Hoetzer et al. |
| 7,140,740 | B1 | 11/2006 | Cooper |
| 7,311,405 | B2 * | 12/2007 | Irvin .................... B60R 1/0602 359/507 |
| 2005/0180152 | A1 | 8/2005 | Haag |
| 2006/0193049 | A1 | 8/2006 | Chen et al. |
| 2007/0103780 | A1 * | 5/2007 | Cooper ................. B60R 1/0602 359/509 |
| 2007/0183039 | A1 | 8/2007 | Irvin |
| 2007/0273971 | A1 | 11/2007 | Waldmann et al. |
| 2009/0250533 | A1 | 10/2009 | Akiyama et al. |
| 2011/0292212 | A1 | 12/2011 | Tanabe et al. |
| 2014/0060582 | A1 | 3/2014 | Hartranft et al. |
| 2014/0104426 | A1 * | 4/2014 | Boegel ..................... B60R 1/00 348/148 |
| 2015/0277111 | A1 * | 10/2015 | Bell ....................... G03B 17/12 359/509 |
| 2015/0296108 | A1 * | 10/2015 | Hayakawa ............ G03B 17/08 348/148 |

FOREIGN PATENT DOCUMENTS

| | | |
|---|---|---|
| DE | 3721370 | 1/1988 |
| JP | 56008739 | 1/1981 |
| JP | 56163931 | 12/1981 |
| JP | 02310147 | 12/1990 |
| JP | 03235743 | 10/1991 |
| JP | 06171473 | 6/1994 |
| WO | 8800142 | 1/1988 |
| WO | 2005039932 | 5/2005 |

OTHER PUBLICATIONS

Cooper, Non-Final Office Action for U.S. Appl. No. 11/602,167, filed Nov. 20, 2006, dated Feb. 20, 2009, 21 pages.

Cooper, Final Office Action for U.S. Appl. No. 11/602,167, filed Nov. 20, 2006, dated Nov. 25, 2009, 12 pages.

* cited by examiner

OBSTRUCTION-REMOVAL SYSTEM AND METHOD FOR VEHICLE-CAMERA LENS

CROSS-REFERENCE TO RELATED APPLICATION

This application claims the priority benefit of U.S. Provisional Patent Application Ser. No. 62/008,565, filed Jun. 6, 2014, which is hereby incorporated herein by reference.

TECHNICAL FIELD

The present invention relates generally to external cameras of vehicles, and more particularly to systems and methods for cleaning the lens covers of rear-view and other cameras on motor vehicles such as trucks, buses, and recreational vehicles.

BACKGROUND

On large motor vehicles such as tractor-trailer and garbage trucks, external rear-view cameras and mirrors provide the only effective way for the driver of the vehicle to observe traffic and related conditions to the rear of the vehicle. For example such rear-view cameras and mirrors are commonly used when backing up and when passing other vehicles. Such cameras and mirrors are mounted in positions external to the vehicle driver (and any passengers), with a rear camera mounted in an external position to the rear of the vehicle, with two side cameras and/or two side mirrors mounted in external positions to the sides of the vehicle, and with an internal display for the rear-view image(s) captured by the camera(s).

While systems are readily available for removing rainwater from vehicle windshields and even side mirrors, there are no known systems that have proven satisfactory for clearing external cameras. Unfortunately, because such cameras and mirrors are mounted in external positions to the rear and sides of the vehicle, their exposed optical surfaces (i.e., camera lens covers and mirror reflecting surfaces) are highly exposed to the accumulation of obstructions such as rainwater, mud, snow, ice, road salt, and other foreign material. This is particularly true during inclement weather, when use of the cameras and mirrors is even more critical than normal. For example, during wet and rainy conditions, rainwater and/or water mist adhere to the external cameras and mirrors, making it difficult to capture a rear-view image. Since a large vehicle such as a tractor-trailer or garbage truck typically does not have a rear-view camera or mirror inside the cab, the driver must rely solely on the external mirrors and cameras to see the space behind the vehicle when making lane changes, backing up, etc. As a result, this lack of visibility results in safety concerns when driving in wet and other inclement conditions.

While periodic cleaning of the external cameras and mirrors can generally provide for good visibility under normal driving conditions, it's difficult if not impossible for a driver to constantly keep the optical surfaces of the external cameras and mirrors clean during unfavorable driving conditions when the vehicle is in motion. This is because the external cameras and mirrors of a large vehicle like a tractor-trailer or garbage truck are positioned remotely from and outside of the reach of the driver's position, making it difficult if not impossible for the driver to reach the camera and/or mirror while driving to clean off any adhered rainwater with a rag or the like. Also, these cameras and mirrors are mounted high off of the ground, making it difficult to clean them when stopped at a truck stop. Moreover, for proper use due during wet and rainy weather, the cameras and mirrors need to be cleaned quite often due to the ongoing build-up of obstructions, so stopping to frequently clean them would increase overall travel time thereby decreasing efficiencies and profits, so this is not a practical option.

Accordingly, it can be seen that needs exists for improvements for clearing moisture and debris from rear-view cameras of large vehicles, alone or in combination with clearing rear-view mirrors. It is to the provision of solutions to these and other problems that the present invention is primarily directed.

SUMMARY

Generally described, the present invention relates to a clearing system removes water and other obstructions from an external-mounted rear-view camera of a vehicle. The system includes an air line connected to a compressed-air source and routed to the camera, and a control valve operable to selectively release compressed air from the air source through the air line. A discharge nozzle of the air line is positioned adjacent a lens cover of the camera to deliver an air blast across the lens cover to remove adhered water. The nozzle is positioned outside of the field of view of the camera so that it does not obstruct the view of the camera.

In various embodiments, the compressed-air source and the camera are preexisting and the clearing system is retrofit onto the vehicle, the compressed-air source and/or the camera are provided together with the clearing system as a kit, and/or the clearing system is installed as original equipment on the vehicle as a system for improved visibility for the vehicle driver.

In some embodiments, the vehicle external camera water-removal system is easily retrofitted to large vehicles without the need for expensive adaptations and the like. In some embodiments, the vehicle external camera water-removal system can be used while driving the vehicle without the need for the driver to move from the driver's seat. In some embodiments, the vehicle external camera water-removal system forces a downwardly-directed sheet of compressed air from the top portion of the external camera substantially over the entire surface of the external camera lens to blow off any water adhering to the lens surface. In some embodiments, the vehicle external camera rainwater-removal system is operable manually as needed or automatically with the operation of the windshield wipers. In some embodiments, the vehicle external camera rainwater-removal system can be used in connection with an existing air-brake and/or air-suspension system normally found on large vehicles such as trucks and buses thereby eliminating the need for and the expense of adding an auxiliary high-pressure air source to the vehicle.

The specific techniques and structures employed to improve over the drawbacks of the prior systems and methods, and to accomplish the advantages described herein, will become apparent from the following detailed description of example embodiments and the appended drawings and claims.

DETAILED DESCRIPTION OF EXAMPLE EMBODIMENTS

The present invention relates to an obstruction-removal system for a lens cover of a vehicle camera. The system can be used on a variety of different types of vehicles, particularly large motor vehicles such as trucks (e.g., garbage trucks and tractor trailers), buses (e.g., school and munici-pal/transit), recreational vehicles, and trailers (e.g., for boats or other cargo). The system can also be adapted for use on other vehicles such as passenger cars, trucks, and SUVs. The system can be used to clear the camera-lens cover of rainwater as well as other obstructions such as other water deposits (e.g., fog, mist, and splashes), mud, snow, ice, road salt, and other foreign material adhering to the camera lens cover. To clear the external-camera lens, the system uses pressurized gas to blow the water and other obstructions from the lens cover. As described herein, the system uses pressurized air, but optionally the system can use another pressurized gas such as $CO_2$. As such, references herein to a water-removal system, an air nozzle, etc. are used for illustration purposes only and are not intended to be unnecessarily limiting of the invention.

Figure 1:
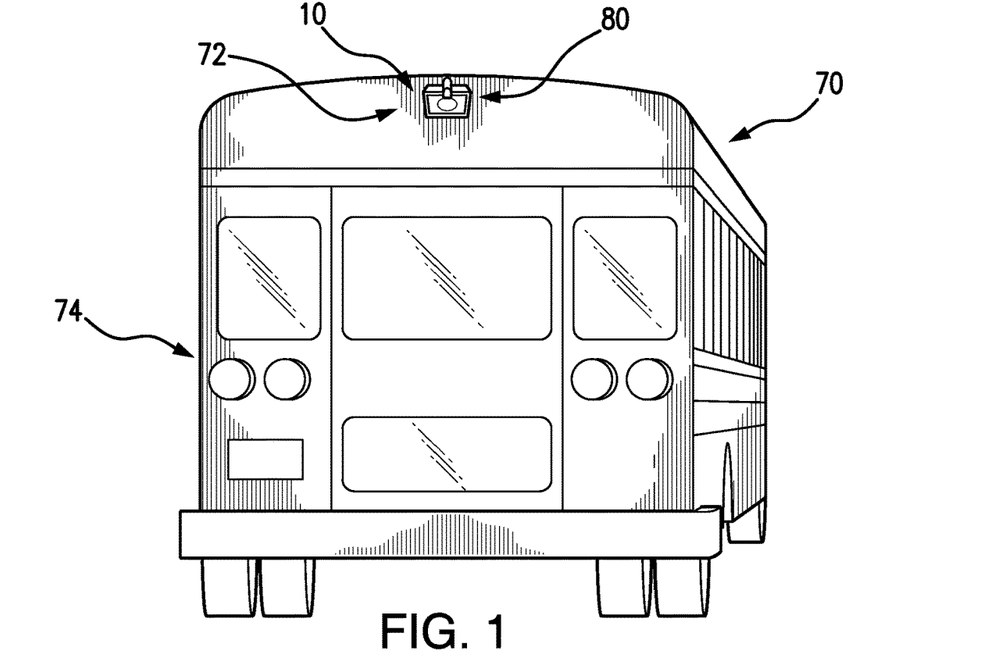
FIG. 1 is a perspective view of a rear portion of a large vehicle having a rear-view camera with a water-clearing system according to a first example embodiment of the present invention.
Figure 2:
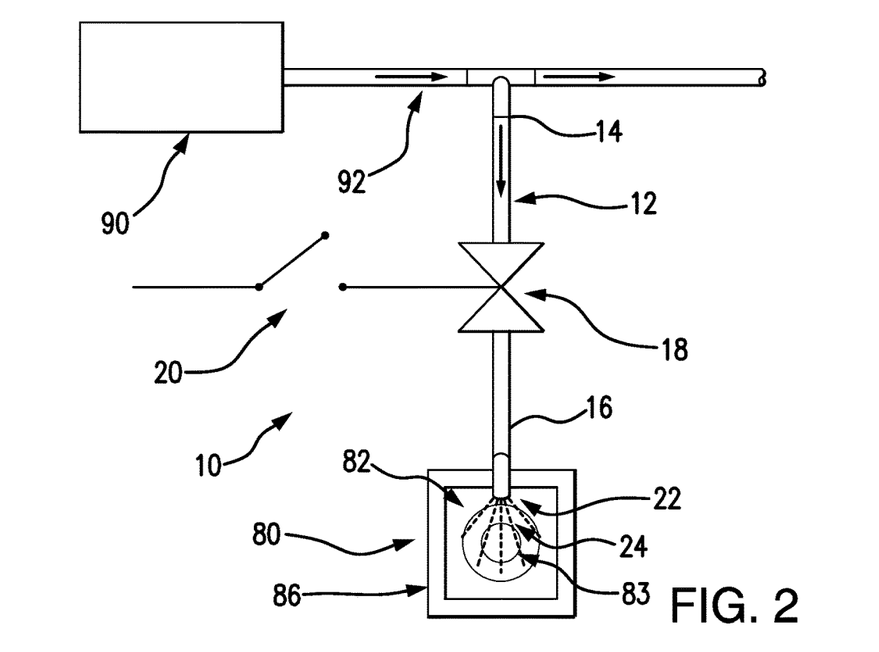
FIG. 2 is a block diagram of the major components of the water-clearing system of FIG. 1.

Referring now to the drawings, FIGS. 1-2 show an aftermarket water-removal system 10 according to a first example embodiment of the invention. The system 10 is used with a large vehicle 70 (a bus is depicted), an external camera 80 mounted to the vehicle, and a compressed-air source 90 mounted to the vehicle.

Figure 3:
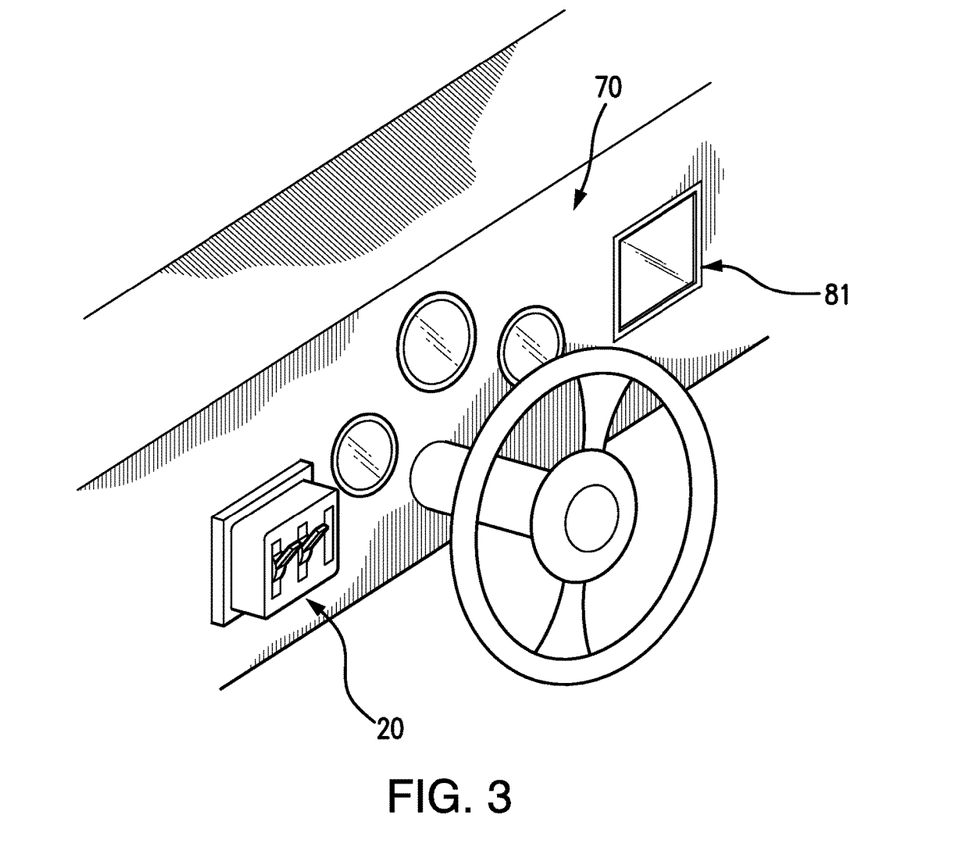
FIG. 3 is a perspective view of a driver's instrument panel of the vehicle interior, showing a switch of the water-clearing system of FIG. 2.
Figure 7:
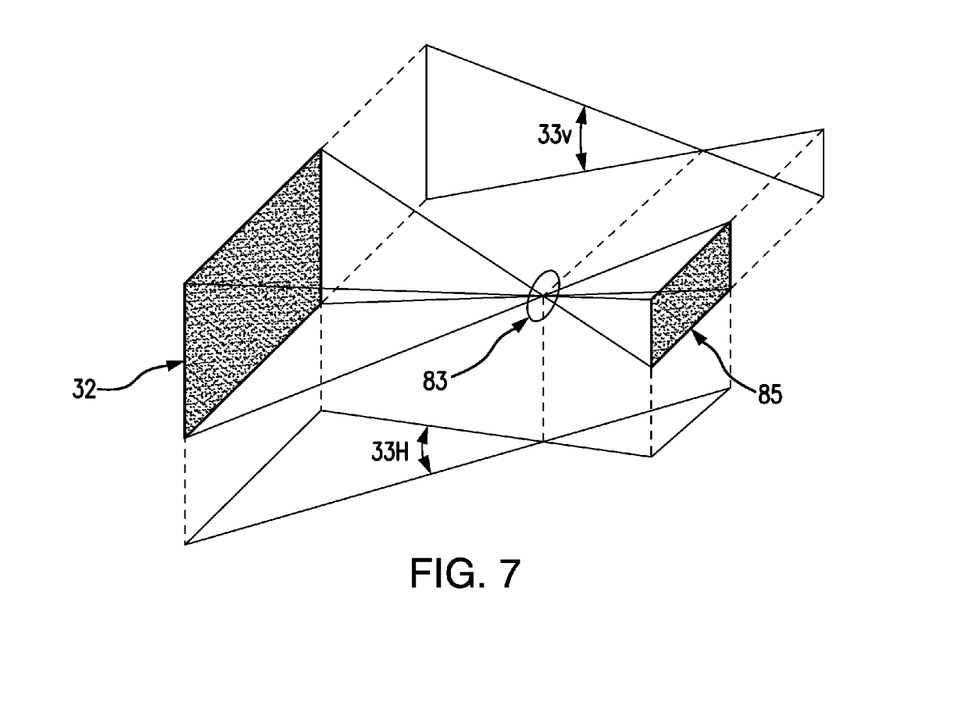
FIG. 7 is a perspective view of optical components of the camera of FIG. 2 showing the field of view of the camera.

The external camera 80 includes a lens 83, a lens cover 82, and a camera sensor 85 (see FIG. 7). The external camera 80 is a component of a camera system including a display screen (e.g., a monitor) 81 (see FIG. 3), control wiring (not shown) routed between the camera and the display, and power wiring (not shown) supplying electric power to the camera and the display from the vehicle power source (e.g., the battery). The display screen 81 is typically located for example on the driver's instrument panel in the cab of the vehicle 70, for example as an integral part set into the dashboard (e.g., as depicted in FIG. 3) or as a separate component mounted on top of the dashboard. The camera 80 can be of a conventional external type commonly provided on large vehicles, for example those commercially available under the brand name 3RD EYE MOBILEVISION from Alliance Wireless Technologies, Inc. (Houston, Tex.). In typical embodiments, the camera 80 captures live video for displaying on the display screen 81, though in some embodiments the camera is selected for additionally or alternatively capturing still images (e.g., for security or locating applications), and as such the term "image" as used herein means video and/or still images. The camera 80 is typically pre-existing as an original-equipment component of the vehicle 70, and thus is typically not a new component of the aftermarket water-removal system 10.

The lens cover 82 protects the optical lens 83 (e.g., from scratching) of the camera 80, and it's substantially transparent so as to not interfere with the optics of the lens. In the depicted embodiment, the system 10 clears water and/or other obstructions from the lens cover 83. In other embodiments, the camera has a lens that is low-cost, replaceable, and/or otherwise constructed so that a protective cover is not provided, and the system clears water and/or other obstructions from the lens itself. Thus, the camera-clearing systems function to clear water and/or other obstructions directly from the lens cover and thus indirectly from the covered lens, or they clear it directly from the lens itself, and the distinction is not important in this context because a primary purpose of the invention is to remove obstructions from the camera's field of view. As such, as used herein, the terms "lens" and "lens cover" are used interchangeably.

Large vehicles such as buses, garbage trucks, tractor-trailer trucks, etc., typically have an air-brake system and/or an air-suspension system including an on-board compressed-air source 90. In this embodiment, the compressed-air source 90 is preexisting as an original-equipment component of the vehicle 70, and is not a new component of the aftermarket water-removal system 10. The compressed-air source 90 is typically in the form of a tank, reservoir, or other container that holds the compressed air (or other gas), that is mounted to the frame of the vehicle 70, and that includes a fill valve (for refreshing/adding compressed air, an outlet to which the air line 92 is connected, a safety relief valve, pressure sensors (e.g., connected to a compressor and/or to indicators on the driver instrument panel), and the like. This compressed-air source 90 can be a component of a larger pneumatic system that includes a compressor connected by an air line to the fill valve, and an air dryer connected at or before the compressor inlet. The compressed-air source 90 can be of a conventional reservoir-tank type commonly provided on large vehicles, for example those commercially available from brand-name manufacturers though outlets such as RUSH TRUCK CENTER (numerous locations, including Smyrna, Ga.). And in the event passenger vehicles (e.g., passenger cars and SUVs) are fitted with pneumatic systems including air compressors and reservoirs for maintaining tire pressures and/or for other uses, the compressed-air source 90 can be provided by such pneumatic-system components. In other embodiments, the compressed-air source 90 is a compressor itself (without a tank for holding pressurized air), and in still other embodiments, it is a compressed-air tank itself (without a compressor, for recharging for example at fuel stations or maintenance shops).

In some other embodiments, the external camera 80 (and optionally the related components of the camera system), the compressed-air source 90 (and optionally the related components of the pneumatic system), or both, are included with the water-removal system 10 in a retrofit kit for aftermarket installation. For example, the water-removal system 10 and the camera system (including the external camera 80) can be provided together in a retrofit kit for aftermarket installation on vehicles 70. And in other embodiments, the water-removal system 10, as well as the external camera 80, the compressed-air source 90, or both, are original-equipment systems of the vehicle 70 as originally manufactured.

Referring particularly to FIG. 2, there are shown the major components of the water-removal system 10. In this embodiment, the aftermarket system 10 is adapted for use with a vehicle 70 having an existing, on-board source of compressed air 90 and an existing air line 92 running to air-operated vehicle systems such as the brakes, the suspension, etc. The system 10 includes an air line (e.g., a conduit, hose, or tube) 12 that receives a supply of compressed air from the air source 90 and that has a proximal end 14 and a distal end 16. For example, the air line 12 can be connected into the existing air line 92 at the airline's proximal end 14 (e.g., by a T-joint cut into the existing air line), as depicted, or it can be connected directly to the air source. The air line 12 can be made of a flexible material, for example a plastic, elastomeric, rubber, or metal, provided in for example a ⅛-inch inner-diameter size, and rated at for example at least about 120 psi.

For most large vehicles, the air brakes are connected to and run by a dedicated primary-air system, and a secondary-air system is provided for other air-powered systems such as shocks, seats, tires, and assists (e.g., for hydraulic lifts of garbage trucks), with these pneumatic systems typically operating at about 120 psi. It should be noted that the water-clearing system 10 of this embodiment is generally intended to be tapped into the compressed-air source 90 of the secondary-air system for safety concerns, that is, so that use of the system does not bleed down the pressure in the primary-air system needed for braking. In some circumstances and/or embodiments, however, the water-clearing system 10 can be tapped into the primary-air system for the air brakes. For example, the water-clearing system 10 can include a pressure regulator (not shown) inline with the air line 12 to prevent system operation (i.e., opening of the valve 18) above and/or below preset pressure limits. In this way, the water-clearing system 10 can be used without risk of bleeding down the pressure in the primary-air system needed for braking. Of course, such a pressure regulator can be included in the system when tapped into the secondary-air system, too.

The air line 12 can be run between the existing compressed-air source 90 (e.g., via the existing air line 92) and the existing camera 80 by routing it through existing electrical conduit (not shown) for the electrical power and control wiring for the camera. This can be done by using conventional snaking techniques. Optionally, the air line 12 can be run externally and secured to the vehicle 70 by for example mounting clips, straps, or ties.

A control valve 18 is provided inline in the air line 12 and is movable between open and closed positions to control the flow of compressed air through the air line 12 from is proximal end 14 to its distal end 16. The valve 18 can be mounted to the container (e.g., tank) of the compressed-air source 90 with the distal end 14 of the air line 12 connected to it, or it can be installed anywhere along the length of the air line for example at any location that is convenient and accessible. The valve 18 is typically an electronic-control valve that can be operated remotely via a wired or wireless connection. For example, the valve 18 can be of a conventional electronic-control type, and rated at for example at least about 120 psi, such as that commercially available from SMC Corporation of America (Noblesville, Ind.). Additionally or alternatively, a manual control valve can be provided in the air line 12 for hand operation to control the flow of compressed air through the air line 12 from is proximal end 14 to its distal end 16.

A control actuator 20 is provided for opening and closing the valve 18 to provide a blast 24 of the compressed air to the distal end 16 of the air line 12. As such, the actuator 20 is operably connected to the valve 18 by control wiring, or alternatively by a wireless (e.g., RF) connection. As shown in FIG. 3, the actuator 20 can be provided by a toggle switch mounted inside the cab of the vehicle 70 on the driver's instrument panel where it can be easily accessed and manually operated by the driver to provide the blast of air. Also, the actuator 20 can be mounted near the display screen 81 for the camera 80, for convenience of use to visually confirm that the camera lens has been cleared. The actuator 20 can be of a conventional 12 vDC type for example that commercially available from SMC Corporation of America (Noblesville, Ind.). Thus, the actuator 20 can be provided by a momentary switch that when moved (e.g., toggled/flipped, depressed, rotated, or slid) and released momentarily opens the valve 18 to deliver the air blast 24 and then closes (e.g., by spring action) the valve to conserve air pressure (instead of manually turning off the valve). Optionally, the system 10 alternatively or additionally can be configured for automatic operation of the valve 18 when the windshield wipers of the vehicle 70 are turned on, and/or for a combination of both manual and automatic operation. In an embodiment with only a manual control valve or with automatic operation (e.g., in conjunction with the windshield wipers), the actuator is not provided.

In addition, a nozzle 22 is positioned at the distal end 16 of the air line 12 to direct the blast 24 of compressed air onto the camera lens cover 82. In the depicted embodiment, the nozzle 22 has a uniform inner diameter along its axial length and as such does not increase or decrease the flow-rate of the air exiting through it. For example, the nozzle 22 can be provided by a malleable ring made of metal (e.g., copper) and crimped onto the distal end 16 of the air line 12, as in the depicted embodiment, or it can be provided in other conventional forms such as by an integral portion (e.g., the distal end) of the air line. In other embodiments, the nozzle has internal geometry configured to accelerate or decelerate the airflow, as may be desired. For example, the nozzle can have a reduced inner diameter (forming a reduced cross-sectional inner area) to accelerate the airflow being dispersed through it. For embodiments designed for use on large vehicles having an on-board pneumatic system including a compressed-air source 90 that is rated at about 120 psi, the nozzle 22 typically need not accelerate the airflow. But for embodiments designed for use on passenger vehicles that do not have an on-board compressed-air source 90 and for which one is provided and rated at lower pressures, it can be beneficial to include a nozzle that accelerates the airflow. As such, the term "nozzle" as used herein is intended to be broadly construed to include any hollow gas-dispersing structure with an opening through which air (or another gas) can be directionally exited.

It should also be noted that in some embodiments the nozzle can be positioned inline in an intermediate portion of the air line 12 (i.e., not at its distal end). For example, this can be done to connect two nozzles in series to clear two nearby cameras by one air line back to the air source, with the air line extending beyond the first/intermediate nozzle and on to the second/distal one. Or this can be done simply to position the nozzle at other than at the distal end of the air line for flow-characteristic or design-choice reasons.

Figure 4:
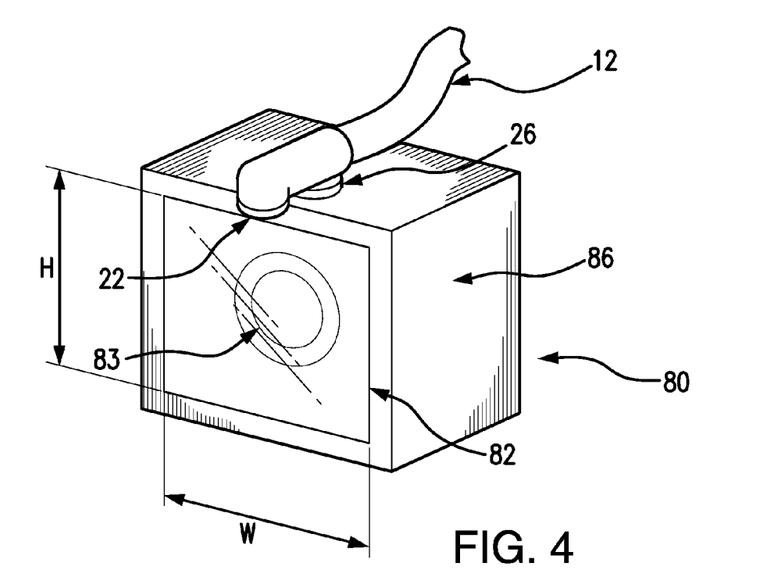
FIG. 4 is a perspective view of the camera with an air nozzle of the water-clearing system of FIG. 2 mounted directly to it.
Figure 5:
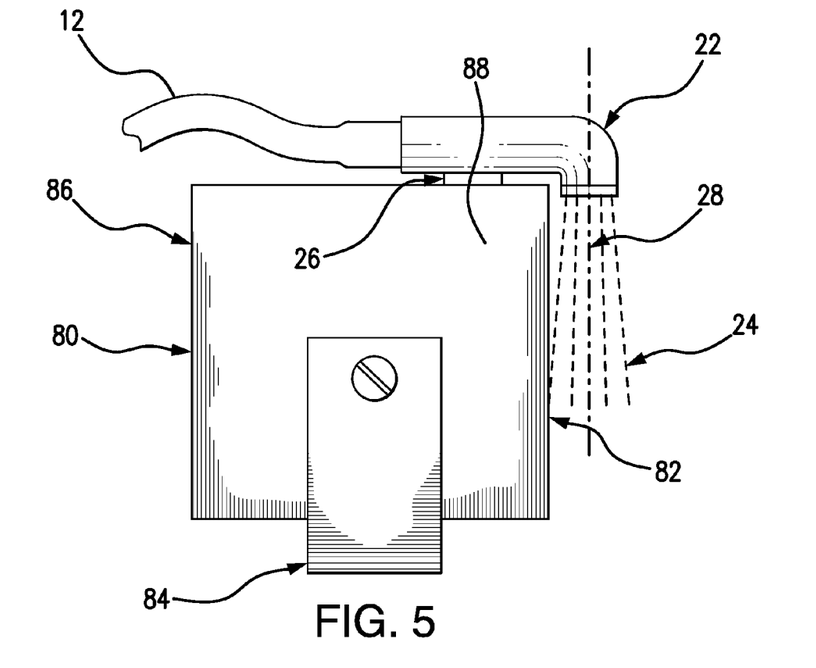
FIG. 5 is a side view of the camera and the air nozzle of FIG. 4.
Figure 6:
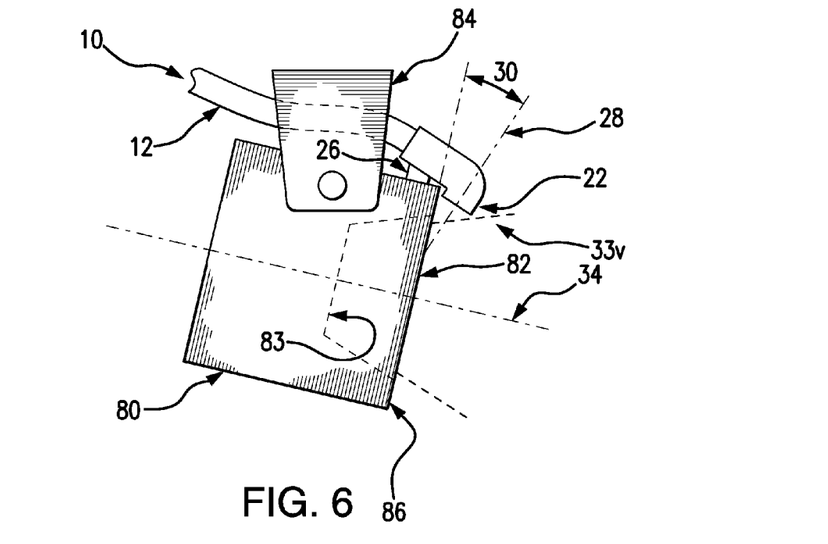
FIG. 6 shows the camera and the air nozzle of FIG. 5 with the nozzle positioned clear of the angle of view of the camera lens.

Referring to FIGS. 4-6, the nozzle 22 is mounted in place adjacent the camera 80 by a fastener 26, with the camera 80 typically mounted to the vehicle 70 by for example a mounting bracket 84. In the depicted embodiment, the nozzle 22 is mounted directly to the housing 86 of the camera 80, and the fastener 26 is an adhesive (e.g., hot glue or epoxy). In other embodiments, the nozzle is mounted to other nearby structures, for example to the vehicle, a mounting bracket extending from the vehicle, or a rain shield extending from the vehicle, to position it in place adjacent the camera. And in other embodiments, the nozzle is mounted in place adjacent the camera by other fasteners, such as mechanical ties, screws, nuts and bolts, clips, clamps, straps, bands, or the like. It will be understood that mounting the nozzle 22 means directly affixing it in place adjacent the camera 80 or indirectly affixing it in place by affixing the air line 12 (e.g., its distal end 14) and/or another connected structure.

The nozzle 22 is positioned adjacent the camera 80 so that the blast 24 of compressed air issued from it is directed to flow over/across the lens cover 82 of the external camera 80. As such, the system 10 uses pressurized air (or another gas) to pressure-blow substantially all of the adhered water (or other foreign-matter obstruction) off of the lens cover 82. Thus, the system 10 does not use a cleaning liquid such as water or a chemical cleaner of any type, as applying these onto the lens cover 82 would impair its optical characteristics and thereby distort the image seen by the lens 83 of the camera 80. That is, the use of cleaning liquids such as water and/or chemical cleaners tends to leave residual spots on the camera lens cover 82, making the image-capture visibility problem worse, whereas the present system 10 can be used to remove (by applying air blasts) the view-obstructing water before it dries on the lens cover.

The nozzle 22 is typically positioned adjacent a top portion 88 of the housing 86 of the camera 80 so that the blast 24 of compressed air is directed generally downward onto a top portion of the camera lens cover 82 and thus onto/across all or at least a substantial portion of the lens cover. In cooperation with gravity, the blast 24 of air blows off water that was adhering to the lens cover 82. In particular, this position of the nozzle 22 facilitates a fanning-out of the blast 24 of compressed air to form a sheet of high-velocity gas flowing over the lens cover 82 and forcing adhering water to the outer and lower edges of the camera 80 where it is carried away by the relative ambient airflow (as the vehicle moves through the ambient air). In this way, the blast 24 of compressed air issued from the nozzle 22 is directed to flow down the lens cover 82 of the external camera 80 across substantially an entire height H of the lens cover and across substantially an entire width W of the lens cover to clear water adhering to the lens surface. This includes an embodiment in which a top-positioned nozzle's air-blast clears the lower, central, and middle-upper portions of the lens cover, but not necessarily the two opposing upper-outer corners.

It will be understood that the nozzle 22 can be positioned to blow air not just straight down from above the camera 80 vertically downward across the lens cover 82, but also from an upper side portion of the camera diagonally downward across the lens cover. In other embodiments, the nozzle is positioned adjacent a side or bottom of the camera, for example, when clearing a relatively smaller lens cover of a relatively smaller lens (e.g., 3-inch diameter) but still using air at pressures of about 120 psi.

Referring particularly to FIGS. 5-6, the nozzle 22 can thus be positioned with its airflow axis 28 directed generally across the lens cover 82, that is, substantially lateral relative to the optical axis 34. For example, in FIG. 5 the nozzle 22 is positioned with its airflow axis 28 directed generally across the lens cover 82 and in particular substantially parallel to it. This arrangement is well-suited for embodiments in which the nozzle 22 provides a sufficient diffusive effect on the water on the lens 82, for example when the nozzle has a circular opening and/or sufficiently high exit pressures.

And in FIG. 6, the nozzle 22 is alternatively positioned with its airflow axis 28 directed generally across the lens cover 82 (substantially lateral relative to the optical axis 34), but not substantially parallel to it, and instead at a descending angle 30 to direct the air blast 26 to apply an axial pressure against the water on the lens cover to blow it off. In typical embodiments, for example, the descending angle 30 is about 10 degrees to about 40 degrees. This arrangement is well-suited for embodiments in which, for example, the nozzle 22 has an elongated opening (e.g., a horizontally-slotted opening of a top-mounted nozzle for exiting the airflow from the nozzle in a sheet), the air source 90 and nozzle design provide for relatively lower exit pressures, and/or the lens cover 82 is relatively larger. For example, the nozzle can have a generally rectangular airflow opening and a circular-to-rectangular transition that is an integral section or a separate adapter.

Referring particularly to FIGS. 6-7, the nozzle 22 is mounted in place adjacent the camera 80 in a position clear of (beyond or outside of) and thus not interfering with the field of view 32 of the camera 80. The field of view 32 (as used herein) is typically rectangular and thus defined by the vertical angle-of-view $33_V$ and the horizontal angle-of-view $33_H$ of the camera 80 (collectively, the "angles of view 33"), which are both centered about the optical axis 34 of the lens 83. As such, the nozzle 22 is mounted in place adjacent the camera 80 in a position laterally outward of (relative of the optical axis 34) the angles of view 33 and thus not obstructing the field of view 32 of the camera 80. For example, the top-mounted nozzle 22 depicted in FIG. 6 is positioned laterally above the vertical angle-of-view $33_V$ so that it's not in the image captured by the camera 80 and displayed on the screen 81. Conventional external cameras 80 on vehicles 70 are of a wide-angle or fish-eye type, with their horizontal angle-of-view $33_H$ being typically for example about 110 degrees to about 180 degrees, and with their vertical angle-of-view $33_V$ being typically about 110 degrees or relatively smaller. In some embodiments, the nozzle might end up being positioned with an insignificant portion of it extending into the field of view, but only when that portion is so insignificant that it does not obscure the captured image and thereby pose a safety hazard.

In addition, the display screen 81 is typically rectangular with dimensions proportional to the field of view 32. It should be noted that, if the image captured by the camera 80 is cropped or otherwise not displayed in its entirety on the display screen 81, then it's the smaller displayed portion of the captured image that defines field of view 32 for purposes of describing this embodiment of the invention. For example, the image circle of the circular lens 83 may cover more than (or less than) the rectangular area of the field of view 32, but what typically matters is that the nozzle 22 not obstruct the field of view as displayed to the driver of the vehicle 70. Moreover, many conventional cameras 80 include lights that are automatically powered-on with the camera, when the vehicle 70 is placed in reverse, and/or in response to low-light conditions as sensed by a light sensor (e.g., a photovoltaic cell), and typically the nozzle 22 is positioned to not obstruct the lights from illuminating the field of view 32.

Accordingly, the nozzle 22 typically does not extend directly in front (distally) of the camera lens cover 82, and instead its discharge outlet 23 is positioned at or outwardly offset (laterally in any transverse direction) relative to the lens cover and to the angles of view 33. So the farther in a distal direction (forward of the lens cover 82 and parallel to the optical axis 34) the nozzle 22 is positioned relative to the camera 80, the farther outwardly/laterally offset it must be positioned. As such, typically the nozzle 22 is positioned contacting against the front portion of the camera body 86 or distally from it so that the nozzle's discharge outlet 23 is within about an inch or so distally forward of the camera body. With the nozzle 22 so positioned, it does not show up in the image captured by the camera 22 and displayed in the cab of the vehicle, and thereby does not present a safety hazard by blocking/obscuring a portion of the field of vision otherwise captured by the camera, while still providing the desired lens-clearing air blast.

In some embodiments, the water-clearing system 10 includes a pressure regulator (not shown) inline with the air line 12 to prevent operation to deliver the air blasts 24 above and/or below preset pressure limits. For example, a pressure regulator can be provided to prevent the valve 18 from being opened to avoid an under-pressure condition when other pneumatic systems are (or might be) needed. And in embodiments with multiple cameras and thus multiple nozzles and valves, a pressure regulator can be provided to permit only one of the valves to be opened at a time to avoid under-pressure conditions (or this can be accomplished by mechanically or electrically interconnecting the actuators so that only one can be operated at a time). However, in many embodiments the compressed-air source 90 is normally maintained at 120 psi by a pneumatic-system compressor (to prevent under-pressure conditions) and by a safety relief valve (to prevent over-pressure conditions), so under-pressure and over-pressure conditions are typically not a concern.

In other embodiments, the vehicle 70 includes a plurality of the external cameras 80 and the water-clearing system 10 is adapted to provide for removing water from all or at least more than one of them. For example, some large vehicles include two side-mounted rear-view cameras mounted at the left and right sides of the vehicle adjacent the front doors, and some large vehicles (e.g., garbage trucks) include a front camera (for documenting anything run over by the truck) and a compactor-bin camera (for monitoring and/or documenting what is being crushed). For use with such vehicles, the system can include a plurality of air lines (e.g., a manifold), each with a respective nozzle positioned adjacent a respective one of the cameras. The air lines can be individually controlled by dedicated valves and dedicated actuators (in respective branch sections of the air lines), or they can be gang-controlled by one valve and actuator (in a trunk section of the air lines).

In still other embodiments, the water-clearing system is installed on a new vehicle as original equipment, for example during its manufacture (at the factory) or at its sales location (at the dealership). The components in such combination embodiments are typically the same as in the aftermarket retrofit system for existing vehicles with existing cameras described above.

In another aspect of the invention, there is provided a method of retrofitting the water-clearing system 10 onto a vehicle having an existing external camera 70 and an existing compressed-air source 80. The method includes the steps of connecting the air line 12 to the air source 80, for example by cutting its distal end 14 into an existing air line 92 (e.g., using a T-joint) connected to the air source. The control valve 18 in the air line 12 is mounted to the vehicle (e.g., to the vehicle frame) 70, the actuator 20 is mounted in the cab of the vehicle (e.g., to the instrument panel), the air line is routed to the camera (e.g., through an existing conduit for the camera wiring) 80, and any needed control wiring between the valve and the actuator is run (e.g., along with the air line). The air line nozzle 22 is mounted adjacent the camera 70, but outside of the field of view 32 of the camera, and aimed laterally across the lens cover 82. To ensure proper installation and operation, the actuator 20 can be activated to deliver a test blast of air 24 to clear the lens cover 82 of the camera 70.

Figure 8:
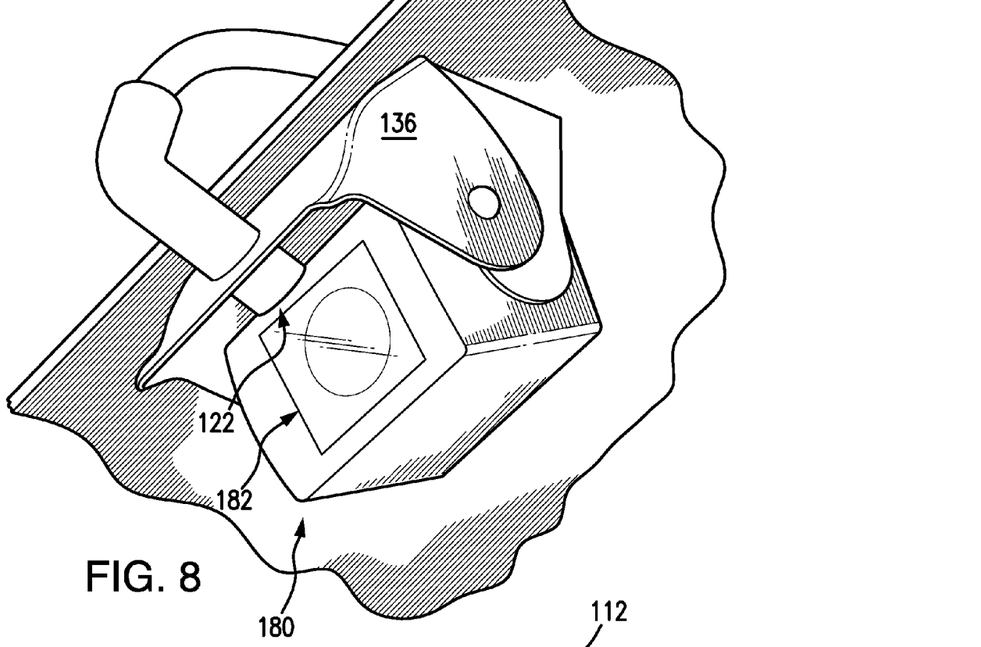
FIG. 8 is a perspective view of a rear portion of a large vehicle having a rear-view camera with a water-clearing system according to a second example embodiment of the present invention, showing a rain shield for the camera and the air nozzle mounted to the rain shield.
Figure 9:
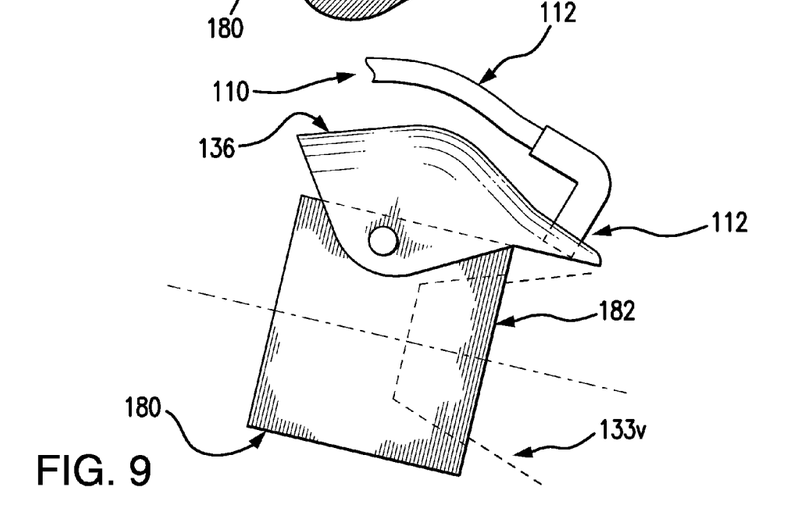
FIG. 9 is a side view of the camera and the air nozzle of FIG. 7 with the nozzle positioned clear of the angle of view of the camera lens.

FIGS. 8-9 show a portion of a water-clearing system 110 according to a second example embodiment of the present invention. This system 110 is similar to others described herein. In this embodiment, however, the nozzle 122 on the air line 112 is mounted to a rain shield (e.g., a hood) 136 for the camera 180. The nozzle 122 is still positioned aiming the air blast generally laterally across the camera lens cover 182 and positioned clear of the vertical angle of view $133_V$ (and thus the field of view) of the camera 180, as in the first embodiment.

Figure 10:
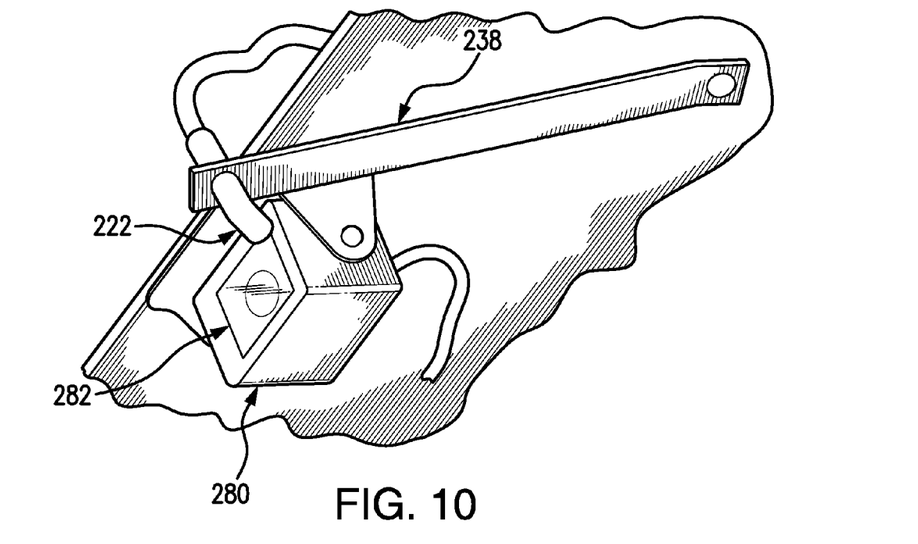
FIG. 10 is a perspective view of a rear portion of a large vehicle having a rear-view camera with a water-clearing system according to a third example embodiment of the present invention, showing the air nozzle mounted to a mounting bracket.
Figure 11:
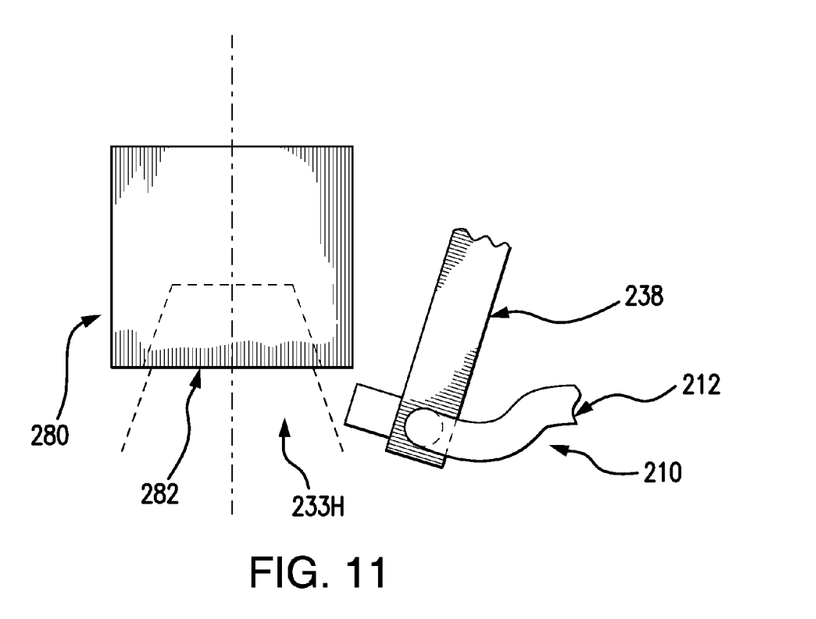
FIG. 11 is a top view of the camera and the air nozzle of FIG. 9 with the nozzle positioned clear of the angle of view of the camera lens.

FIGS. 10-11 show a portion of a water-clearing system 210 according to a third example embodiment of the present invention. This system 210 is similar to others described herein. In this embodiment, however, the nozzle 222 on the air line 212 is mounted to a mounting bracket 238 extending from the vehicle. The mounting bracket 238 can be provided by an extension bar (as depicted), a piece of channel, a panel, a plate, a rod, an L-member, or another structural element mounted to the vehicle. The nozzle 222 is still positioned aiming the air blast generally laterally across the camera lens cover 282 and positioned clear of the horizontal angle of view $233_H$ (and thus the field of view) of the camera 280, as in the first and second embodiments.

Figure 12:
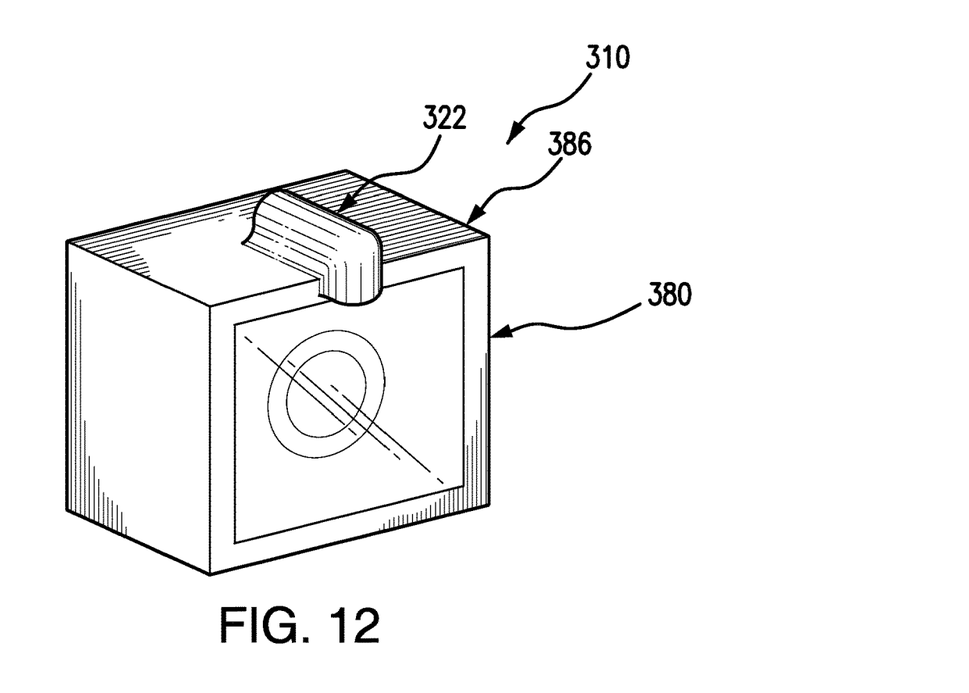
FIG. 12 is a perspective view of a portion of a water-clearing system according to a fourth example embodiment of the present invention, showing a rear-view camera with an integral air nozzle.

FIG. 12 shows a portion of a water-clearing system 310 according to a fourth example embodiment of the present invention. This system 310 is similar to others described herein. In this embodiment, however, the nozzle 322 is integrally formed with the housing 386 of the camera 380 as a single piece. For example, the nozzle 322 and the camera housing 386 can be molded of a plastic material using conventional fabrication techniques and equipment. A conventional air-hose connector can be provided at the input end of the nozzle 322 for connection to the air line of the system 310. This embodiment is well-suited for use in applications where the camera 380 is provided together with the system 310 in a kit for installation together at the same time for aftermarket or original-equipment applications.

Figure 13:
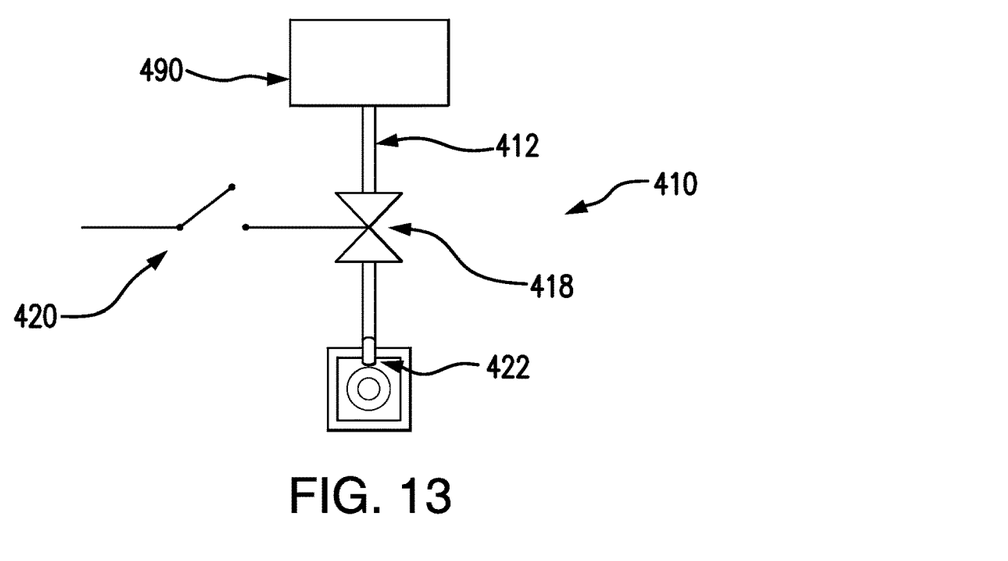
FIG. 13 is a block diagram of the major components of a water-clearing system according to a fifth example embodiment of the present invention in which the compressed air supply is not pre-existing and is included as a component of the system.

FIG. 13 shows the major components of a water-clearing system 410 according to a fifth example embodiment of the present invention. This system 410 is similar to others described herein, for example it includes an air line 412, a valve 418, and actuator 420, and a nozzle 422. In this embodiment, however, the compressed-air source 490 is not preexisting on the vehicle and instead is included together with the system 410 as a kit for installation together at the same time for aftermarket or original-equipment applications. For example, this embodiment is well-suited for use on vehicles without a preexisting air-brake system and/or an air-suspension system (and thus without an air compressor), including passenger vehicles such as passenger cars and SUVs. In such embodiments, the compressed-air source 490 can be provided by a compressed-air tank that can be recharged at fuel stations or maintenance shops, and the rated air pressure of the system components can be reduced to for example about 60 psi.

Figure 14:
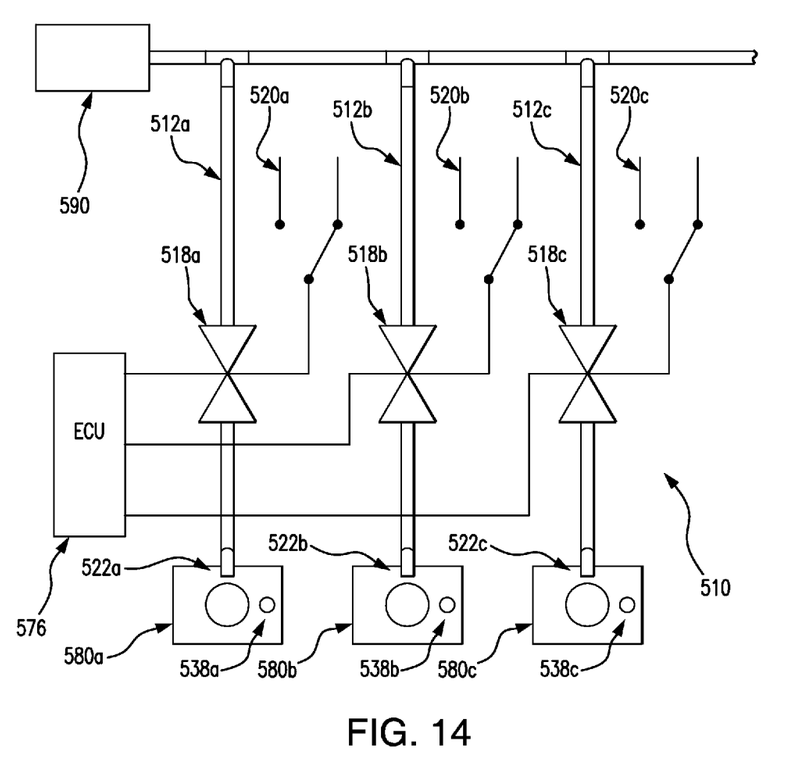
FIG. 14 is a block diagram of the major components of a water-clearing system according to a sixth example embodiment of the present invention with parallel air hoses each for a respective camera and each having a valve controlled by an electronic control unit of the vehicle.

FIG. 14 shows the major components of a water-clearing system 510 according to a sixth example embodiment of the present invention. This system 510 is similar to others described herein, for example, it connects to an existing compressed-air source 590 and directs compressed air for water removal. In this embodiment, however, the system 510 is adapted to direct the air across a plurality of cameras. For example, a first camera 580a can be located/mounted on a left/driver side of the vehicle at (adjacent, below, on, or even in place of) the left side-rear-view mirror, a second camera 580b can be located/mounted at the center-rear of the vehicle (as described above), and a third camera 580c can be located/mounted on a right/passenger side of the vehicle at the right side-rear-view mirror. In other embodiments, the system is adapted to direct forced air across additional cameras and/or other-located cameras for water removal from their respective lens covers.

Typically, the water-clearing system 510 includes a plurality of branch air lines 512a-c with respective nozzles 522a-c and a plurality of respective valves 518a-c for opening and closing the air lines. The valves 518a-c are in operable communication with a plurality of respective actuators 520a-c for manual control thereof (as described above). Additionally or alternatively, the valves 518a-c are in operable communication with an electronic control unit (ECU) 576 of the vehicle, for example by hard wiring or wireless (e.g., RF) signals for automatic control thereof. With the combination of both manual and the automatic controls, if an immediate clearing of one of the cameras 580a-c is desired, the driver can actuate the respective switch 520a-c to send a blast of air to the respective camera as needed. The valves 518a-c can include one blocking element (e.g., a plug or disc) that is automatically or manually controlled, or they can includes two blocking elements each controlled only automatically or manually. In other embodiments, only the automatic or manual control components are provided. And in still other embodiments, the functionality of the plural actuators is combined into one actuator for gang operation (e.g., a two-way switch actuator in which "on" opens all of the valves) or individual operation (e.g., a multi-way switch actuator with multiple "on" positions).

In the depicted embodiment with the automatic control feature, the ECU 576 can be programmed to open the first/left-camera valve 518a to automatically clear the first/left camera 580a in response to the vehicle's indicator-signal arm (of the vehicle's turn-signal system) being moved to the left-turn position for changing into the left lane, to open the second/rear-camera valve 518b to automatically clear the second/rear camera 580b in response to the vehicle's gear shifter being moved to the reverse-gear position for backing up, and to open the third/right-camera valve 518c to automatically clear the third/right camera 580c in response to the vehicle's indicator-signal arm being moved to the right-turn position for changing into the right lane. Alternatively or additionally, the ECU 576 can be programmed for automatic operation of the first/left-camera valve 518a and the third/right-camera valve 518c, and also the second/rear-camera valve 518b, when the windshield wipers (of the vehicle's windshield wiper system) and/or the headlights of the vehicle are turned on and left on, for example, in a repeating periodic fashion with the valves being simultaneously or consecutively/serially opened momentarily then closed to provide the air blast at regular intervals. In such embodiments, the ECU 576 can be programmed to clear the cameras 580a and 580c at longer intervals (e.g., an air blast every 4-10 seconds) when the windshield wipers are in a low-speed position and at shorter intervals (e.g., an air blast every 1-3 seconds) when the windshield wipers are in a high-speed position. Optionally, the intervals can be pre-set and/or adjusted for the climate where the vehicle is primarily used, and/or the intervals can be synched so that some or all of the cameras are cleared every time the windshield wipers cycle across the windshield. Such ECU programming is within the capability of persons of ordinary skill in the art, so process flow diagrams and example program coding are not detailed herein.

Furthermore, at least one moisture sensor can be positioned at (on or adjacent) at least one of the cameras and in communication with the ECU to open the respective valve to clear the respective camera lens cover in response to sensing a pre-set amount of water on it. In the depicted embodiments, for example, a plurality of moisture sensors 538a-c are provided on (as an integral component or an aftermarket addition) the respective cameras 580a-c to clear them by controlling the respective valves 518a-c. Such sensors are commonly used to control windshield wipers and can be of such a conventional type.

Figure 15:
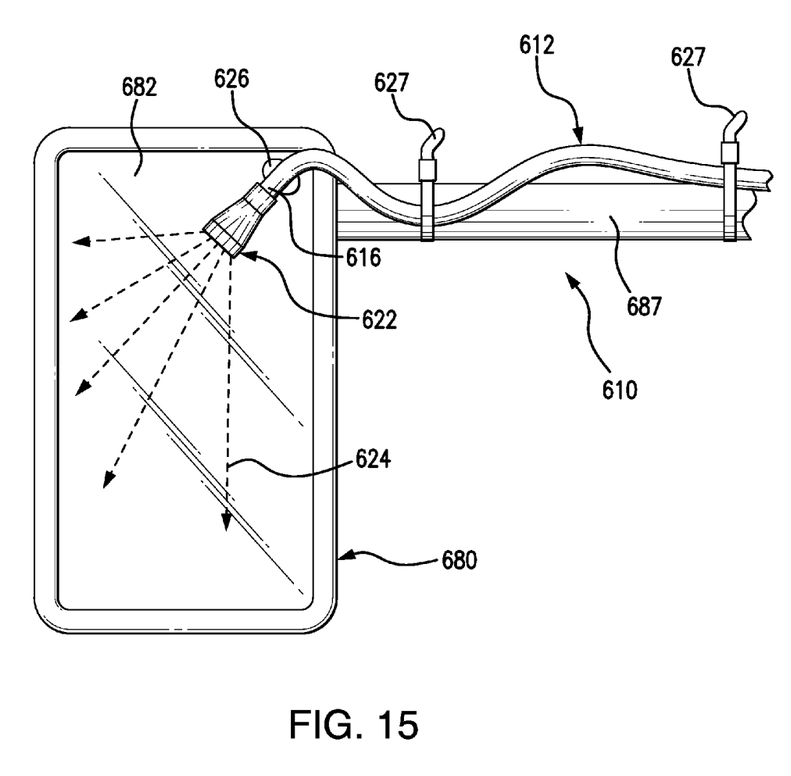
FIG. 15 is a rear view of a rear-view mirror of a large vehicle shown with a portion of a water-clearing system according to a seventh example embodiment of the present invention including parallel air hoses for respective mirrors and also a camera.

FIG. 15 shows a portion of a water-clearing system 610 according to a seventh example embodiment of the present invention. This system 610 is similar to others described herein, for example it includes at least one air line that is connected to a compressed-air source and that has a control valve and actuator and a nozzle for directing blasts of compressed air across a camera lens cover (e.g., as depicted in the previous embodiments). In addition, this system 610 includes at least one air line 612 that is connected to the compressed-air source and that has a control valve and actuator and a nozzle 622 for directing blasts 624 of compressed air across a reflecting surface 682 of an external (e.g., rear-view) mirror 680 of the vehicle. As such, this system 610 is adapted for clearing multiple external optical surfaces in the same manner as the system 510 of FIG. 14, except that it clears a combination of at least one camera and at least one mirror (instead of only cameras).

The mirror-clearing components of this system 610 can be the same or similar to those in the arrangement disclosed in U.S. Pat. No. 7,140,740, which is hereby incorporated by reference herein. As such, the mirror-clearing components are not detailed herein, except to note that the air line 612 can be mounted to a mirror support 687 by fasteners (e.g., the depicted ties) 627, and the nozzle 622 and/or the airline distal end 616 can be mounted to the mirror reflective surface 682 by fasteners (e.g., the depicted glue) 626.

In a typical commercial embodiment, the water-clearing system 610 is configured for clearing one rear-mounted camera and two side-mounted mirrors. In some such embodiments, the actuator can be provided for operating the valves for clearing the rear-mounted camera and the right-mounted mirror, leaving the left-mounted mirror to be manually cleaned by the driver.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A system for removing an obstruction from a protective lens cover of an external camera of a vehicle, the camera having an optical axis and a field of view, the vehicle including a source of compressed gas, the obstruction-removal system comprising:
    a gas line that connects to the compressed-gas source, is routed to adjacent the camera, and includes a discharge nozzle that positions adjacent the camera lens cover to deliver a blast of the compressed gas across the lens cover to remove the obstruction, wherein the nozzle has an airflow axis and in use the nozzle airflow axis is positioned aimed substantially laterally relative to the optical axis, but not parallel to the lens cover, and instead at a descending angle to the lens cover, and wherein the nozzle is positioned outside of the camera field of view so that the nozzle does not obstruct the camera field of view;
    a rain shield that is positioned covering the lens cover of the camera from above, that is positioned outside of the camera field of view so that it does not obstruct the camera field of view, and to which the discharge of the gas line is mounted; and
    a control valve operable to selectively release the compressed gas from the compressed-gas source through the gas line onto the lens cover.

2. The vehicle-camera obstruction-removing system of claim 1, wherein the gas blast removes the obstruction from the lens cover without the use of a cleaning liquid.

3. The vehicle-camera obstruction-removing system of claim 1, wherein the camera defines a horizontal angle of view and in use the nozzle is positioned outside of the camera horizontal angle of view so that the nozzle does not appear in an image captured by the camera.

4. The vehicle-camera obstruction-removing system of claim 1, wherein the camera defines a vertical angle of view and in use the nozzle is positioned outside of the camera vertical angle of view so that the nozzle does not appear in an image captured by the camera.

5. The vehicle-camera obstruction-removing system of claim 1, wherein in use the nozzle airflow axis is positioned aimed to deliver the compressed gas against and across the lens cover so that the compressed gas fans out and spreads over substantially an entire width and length of the lens cover.

6. The vehicle-camera obstruction-removing system of claim 1, further comprising an actuator that operably connects to the valve and that positions inside the vehicle for driver operation thereof.

7. A retrofitting method for improved visibility for a driver of the vehicle of claim 1, comprising:
    providing the gas line and the control valve as an after-market kit;
    connecting the gas line to the vehicle compressed-gas source;
    routing the gas line to the external camera of the vehicle;
    positioning the nozzle of the gas line adjacent to and aimed across the lens cover of the camera;
    mounting the control valve to the vehicle; and
    mounting the actuator to the vehicle.

8. The vehicle-camera obstruction-removing system of claim 1, wherein the vehicle further comprises an electronic control unit, and wherein the control valve operably connects to the electronic control unit for automated operation of the valve.

9. The vehicle-camera obstruction-removing system of claim 8, wherein the vehicle includes a windshield-wiper system, a turn-signal system, or both, and wherein the vehicle electronic control unit is programmed to automatically operate the control valve to clear the lens cover in response to activation of the windshield-wiper system, the turn-signal system, or both.

10. The vehicle-camera obstruction-removing system of claim 1, wherein the vehicle includes a plurality of the external cameras with the lens covers, and wherein the system comprises a plurality of the gas lines routed to the plurality of cameras, a plurality of the nozzles aimed across the plurality of lens covers, and a plurality of the valves for controlling a plurality of the gas blasts to clear the plurality of lens covers.

11. The vehicle-camera obstruction-removing system of claim 1, wherein the descending angle of the airflow axis relative to the lens cover is about 10 degrees to about 40 degrees.

12. The vehicle-camera obstruction-removing system of claim 1, wherein the descending angle of the airflow axis relative to the lens cover is an acute angle.

13. A system for removing water from a protective lens cover of an external camera of a vehicle, the camera defining an optical axis and a field of view, the vehicle including a source of compressed air, the obstruction-removal system comprising:
    an air line connected to the compressed-air source, routed to adjacent the camera, and including a discharge nozzle positioned adjacent the camera lens cover to deliver a blast of the compressed air across the lens cover to remove the water, wherein the nozzle has an airflow axis that is aimed substantially laterally relative to the optical axis, but not parallel to the lens cover, and instead at a descending angle to the lens cover, to deliver the compressed air against and across the lens cover so that the compressed air is fanned out and spread over substantially an entire width and length of the lens cover, and wherein the nozzle is positioned outside of the camera field of view so that the nozzle does not obstruct the camera field of view;

a rain shield that is positioned covering the lens cover of the camera from above, that is positioned outside of the camera field of view so that it does not obstruct the camera field of view, and to which the discharge nozzle of the gas line is mounted, wherein the rain shield includes a top panel extending laterally all the way across the lens cover to cover the lens cover from above and two opposing side panels extending downward from opposing sides of the top panel:

a control valve operable to selectively release the compressed air from the compressed-air source through the air line onto the lens cover; and an actuator operably connected to the valve and positioned inside the vehicle for driver operation thereof to remove the water from the lens cover, wherein the air blast removes the water from the lens cover without the use of a cleaning liquid.

14. The vehicle-camera water-removing system of claim 13, wherein the camera defines a horizontal angle of view and a vertical angle of view, and wherein the nozzle is positioned outside of the camera horizontal angle of view and the camera vertical angle of view so that the nozzle does not appear in an image captured by the camera.

15. The vehicle-camera water-removing system of claim 13, wherein the discharge nozzle extends through and is mounted to the top panel.

16. The vehicle-camera water-removing system of claim 13, wherein the side panels include mounts for supporting the rain shield in place covering the lens cover.

17. A system for removing an obstruction from a protective lens cover of an external camera of a vehicle, the camera defining an optical axis and a field of view, the vehicle including a source of compressed gas, the obstruction-removal system comprising:

a gas line connected to the compressed-gas source, routed to adjacent the camera, and including a discharge nozzle positioned adjacent the camera lens cover, wherein the nozzle has an airflow axis that is aimed substantially laterally relative to the lens optical axis, but not parallel to the lens cover, and instead at a descending angle to the lens cover, to deliver a blast of the compressed gas across the lens cover to remove the obstruction, wherein the nozzle is positioned outside of the camera field of view so that the nozzle does not obstruct the camera field of view; and a control valve operable to selectively release the compressed gas from the compressed-gas source through the gas line onto the lens cover, wherein the gas blast removes the obstruction from the lens cover, wherein the vehicle has turn indicators that turn on and off and wherein the control valve is automatically operated to deliver the blast of the compressed gas to the camera lens cover in response to the turn indicators being turned on.

18. The vehicle-camera obstruction-removing system of claim 17, wherein the camera defines a horizontal angle of view and a vertical angle of view, and wherein the nozzle is positioned outside of the camera horizontal angle of view and the camera vertical angle of view so that the nozzle does not appear in an image captured by the camera.

19. The vehicle-camera obstruction-removing system of claim 17, further comprising an actuator that is operably connected to the valve and that is positioned inside the vehicle for driver operation thereof.

20. The vehicle-camera obstruction-removing system of claim 17, wherein the vehicle comprises an electronic control unit, and wherein the control valve is operably connected to the electronic control unit for automated operation thereof.

21. A system for removing an obstruction from a protective lens cover of an external camera of a vehicle, the camera defining an optical axis and a field of view, the vehicle including a source of compressed gas, the obstruction-removal system comprising:

a gas line that connects to the compressed-gas source, routes to adjacent the camera, and includes a discharge nozzle that positions adjacent the camera lens cover, wherein the nozzle has an airflow axis and in use the nozzle airflow axis is aimed substantially laterally relative to the lens optical axis, but not parallel to the lens cover, and instead at a descending angle to the lens cover, to deliver a blast of the compressed gas across the lens cover to remove the obstruction, and wherein in use the nozzle is positioned outside of the camera field of view so that the nozzle does not obstruct the camera field of view; and a control valve operable to selectively release the compressed gas from the compressed-gas source through the gas line onto the lens cover, wherein the gas blast removes the obstruction from the lens cover, wherein the vehicle has a gear shifter turn and wherein the control valve is automatically operated to deliver the blast of the compressed gas to the camera lens cover in response to the gear shifter being moved to a reverse-gear position.

* * * * *